United States Patent
Jeon et al.

(10) Patent No.: US 10,212,453 B2
(45) Date of Patent: *Feb. 19, 2019

(54) INTRA-PREDICTION METHOD USING FILTERING, AND APPARATUS USING THE METHOD

(71) Applicant: LG ELECTRONICS INC., Seoul (KR)

(72) Inventors: Yongjoon Jeon, Seoul (KR); Seungwook Park, Seoul (KR); Jaehyun Lim, Seoul (KR); Jungsun Kim, Seoul (KR); Joonyoung Park, Seoul (KR); Younghee Choi, Seoul (KR); Jaewon Sung, Seoul (KR); Byeongmoon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,129

(22) Filed: Aug. 14, 2017

(65) Prior Publication Data

US 2017/0347118 A1 Nov. 30, 2017

Related U.S. Application Data

(63) Continuation of application No. 15/217,607, filed on Jul. 22, 2016, now Pat. No. 9,736,496, which is a
(Continued)

(51) Int. Cl.
*H04N 19/593* (2014.01)
*H04N 19/61* (2014.01)
(Continued)

(52) U.S. Cl.
CPC .......... *H04N 19/593* (2014.11); *H04N 19/11* (2014.11); *H04N 19/117* (2014.11);
(Continued)

(58) Field of Classification Search
CPC ...... H04N 19/91; H04N 19/593; H04N 19/85; H04N 19/80; H04N 19/11; H04N 19/50; H04N 19/61; H04N 19/182
See application file for complete search history.

(56) References Cited

U.S. PATENT DOCUMENTS

| 6,816,552 B2 | 11/2004 | Demos |
| 7,228,009 B2 | 6/2007 | Kim et al. |

(Continued)

FOREIGN PATENT DOCUMENTS

| EP | 2254339 | 11/2010 |
| EP | 2262268 | 12/2010 |

(Continued)

OTHER PUBLICATIONS

International Search Report dated Sep. 26, 2013 for Application No. PCT/KR2012/001287, with English Translation, 6 pages.

(Continued)

*Primary Examiner* — Behrooz M Senfi
(74) *Attorney, Agent, or Firm* — Fish & Richardson P.C.

(57) ABSTRACT

Disclosed are an intra-prediction method using filtering and an apparatus using the method. An image-decoding method comprises: a step of filtering an n upper reference pixel of a block to be predicted and neighboring pixels of the n upper reference pixel so as to obtain the filtered n upper reference pixel; and a step of filtering an n left reference pixel of a block to be predicted and neighboring pixels of the n left reference pixel so as to obtain the filtered n left reference pixel. According to the present invention, intra-prediction may be efficiently performed to improve image-encoding/decoding efficiency.

16 Claims, 10 Drawing Sheets

Related U.S. Application Data continuation of application No. 14/000,639, filed as application No. PCT/KR2012/001287 on Feb. 21, 2012, now Pat. No. 9,420,294.

(60) Provisional application No. 61/445,538, filed on Feb. 23, 2011.

(51) Int. Cl.
*H04N 19/11* (2014.01)
*H04N 19/91* (2014.01)
*H04N 19/182* (2014.01)
*H04N 19/80* (2014.01)
*H04N 19/85* (2014.01)
*H04N 19/117* (2014.01)
*H04N 19/176* (2014.01)

(52) U.S. Cl.
CPC ......... *H04N 19/176* (2014.11); *H04N 19/182* (2014.11); *H04N 19/61* (2014.11); *H04N 19/80* (2014.11); *H04N 19/85* (2014.11); *H04N 19/91* (2014.11)

(56) References Cited

U.S. PATENT DOCUMENTS

| | | | |
|---|---|---|---|
| 7,266,150 B2 | 9/2007 | Demos | |
| 7,894,524 B2 | 2/2011 | Demos | |
| 8,050,323 B2 | 11/2011 | Demos | |
| 8,139,639 B2 | 3/2012 | Demos | |
| 8,139,640 B2 | 3/2012 | Demos | |
| 8,139,641 B2 | 3/2012 | Demos | |
| 8,189,667 B2 | 5/2012 | Kawashima et al. | |
| 8,249,158 B2 | 8/2012 | Demos | |
| 9,294,769 B2 * | 3/2016 | Jeon | H04N 19/61 |
| 9,420,294 B2 * | 8/2016 | Jeon | H04N 19/61 |
| 9,736,496 B2 * | 8/2017 | Jeon | H04N 19/593 |
| 2003/0112871 A1 | 6/2003 | Demos | |
| 2004/0005004 A1 | 1/2004 | Demos | |
| 2004/0257475 A1 | 12/2004 | Kim et al. | |
| 2005/0089235 A1 | 4/2005 | Sakaguchi et al. | |
| 2005/0281334 A1 | 12/2005 | Walker et al. | |
| 2007/0268967 A1 | 11/2007 | Demos | |
| 2010/0014587 A1 | 1/2010 | Demos | |
| 2010/0054617 A1 | 3/2010 | Takada | |
| 2010/0118957 A1 | 5/2010 | Demos | |
| 2010/0150253 A1 | 6/2010 | Kuo et al. | |
| 2011/0038415 A1 | 2/2011 | Min et al. | |
| 2011/0096837 A1 | 4/2011 | Demos | |
| 2011/0096838 A1 | 4/2011 | Demos | |
| 2011/0103476 A1 | 5/2011 | Demos | |
| 2011/0103477 A1 | 5/2011 | Demos | |
| 2011/0103478 A1 | 5/2011 | Demos | |
| 2011/0103479 A1 | 5/2011 | Demos | |
| 2011/0243230 A1 | 10/2011 | Liu | |
| 2011/0262050 A1 | 10/2011 | Liu | |
| 2012/0114039 A1 | 5/2012 | Wang | |
| 2013/0034153 A1 | 2/2013 | Song et al. | |
| 2014/0341281 A1 | 11/2014 | Bossen et al. | |

FOREIGN PATENT DOCUMENTS

| | | |
|---|---|---|
| JP | 2006513592 | 4/2006 |
| KR | 20040085891 | 10/2004 |
| KR | 20080041935 | 5/2008 |
| WO | 2003007119 | 1/2003 |
| WO | 2004004310 | 1/2004 |

OTHER PUBLICATIONS

Non-final office action dated Sep. 9, 2015 for corresponding U.S. Appl. No. 14/000,639, 29 pages.

Non-final Office Action dated Oct. 21, 2014 for corresponding U.S. Appl. No. 14/230,656, 17 pages.

Final Office Action dated Mar. 20, 2015 from corresponding U.S. Appl. No. 14/230,656, 13 pages.

"Summary of Results of the First JCT-VC Meeting," Dresden, Apr. 15-23, 2010, 16 pages.

Ugur et al., "Description of video coding technology proposal by Tandberg, Nokia, Ericsson," Doc. JCT-VC-A119, Apr. 15-23, 2010, 33 pages.

Notice of Allowance issued in U.S. Appl. No. 14/230,656 dated Nov. 16, 2015, 19 pages.

* cited by examiner

FIG. 4
Step1. Set right-bottom sample to DC predicted vale (S400)
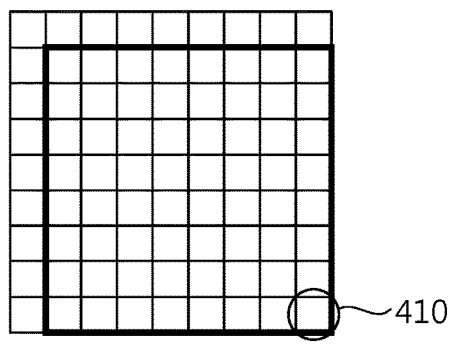
Step2. Interpolate right most and bottom samples (S420)
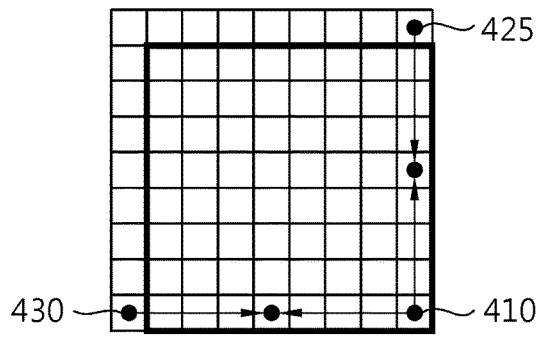
Step3. Bi-linear interpolation of middle samples (S440)
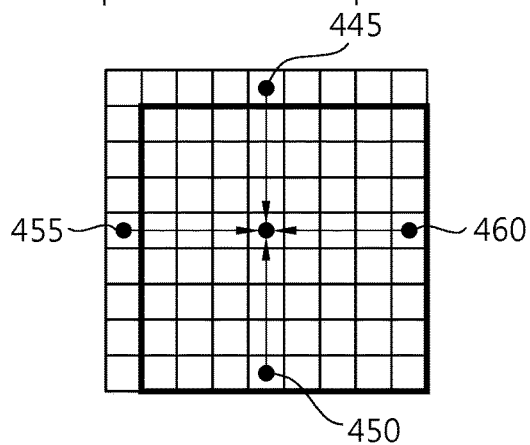

INTRA-PREDICTION METHOD USING FILTERING, AND APPARATUS USING THE METHOD

CROSS-REFERENCE TO RELATED APPLICATIONS

This application is a continuation of U.S. application Ser. No. 15/217,607, filed Jul. 22, 2016, now allowed, which is a continuation of U.S. application Ser. No. 14/000,639, filed Aug. 21, 2013, now U.S. Pat. No. 9,420,294, which is a U.S. National Phase Application under 35 U.S.C. § 371 of International Application PCT/KR2012/001287, filed on Feb. 21, 2012, which claims the benefit of U.S. Provisional Application No. 61/445,538, filed on Feb. 23, 2011, the entire content of the prior applications is hereby incorporated by reference.

BACKGROUND OF THE INVENTION

Field of the invention

The present invention relates to a video decoding method and a video decoding apparatus, and more particularly, to an intra prediction method.

Related Art

Recently, demands for high-resolution and high-quality images, such as high-definition (HD) and ultrahigh-definition (UHD) images, have increased in various fields of applications. As image data has higher resolution and higher quality, an amount of data more increases relative to existing image data. Accordingly, when image data is transferred using media such as existing wired and wireless broad band lines or is stored in existing storage media, the transfer cost and the storage cost increases. In order to solve these problems occurring with an increase in resolution and quality of image data, high-efficiency image compressing techniques may be utilized.

The image compressing techniques include various techniques such as an inter prediction technique of predicting pixel values included in a current picture from previous or subsequent pictures of the current picture, an intra prediction technique of predicting pixel values included in a current picture using pixel information in the current picture, and an entropy encoding technique of assigning a short code to a value with a high appearance frequency and assigning a long code to a value with a low appearance frequency. Image data may be effectively compressed and transferred or stored using such image compressing techniques.

SUMMARY OF THE INVENTION

An aspect of the present invention is to provide an intra prediction method to improve video encoding/decoding efficiency.

Another aspect of the present invention is to provide an apparatus for performing an intra prediction method to improve video encoding/decoding efficiency.

An embodiment of the present invention provides a video decoding method including deriving a filtered nth upper reference pixel by filtering an nth upper reference pixel of a target prediction block and neighboring pixels of the nth upper reference pixel, and deriving a filtered nth left reference pixel by filtering an nth left reference pixel of the target prediction block and neighboring pixels of the nth left reference pixel. The video decoding method may include deriving a prediction value of a bottom-right pixel of the target prediction block using an average of the filtered nth left reference pixel and the filtered nth upper reference pixel, deriving prediction values of pixels included in an nth column of the target prediction block by interpolating the prediction value of the bottom-right pixel of the target prediction block and the filtered nth upper reference pixel and deriving prediction values of pixels included in an nth row of the target prediction block by interpolating the prediction value of the bottom-right pixel of the target prediction block and the filtered nth left reference pixel, and deriving a prediction pixel value of a target prediction pixel by bilinear-interpolating a pixel value of an upper reference pixel and a prediction pixel value of the nth row located in the same column as the target prediction pixel, and a pixel value of a left reference pixel and a prediction pixel value of the nth column located in the same row as the target prediction pixel. The video decoding method may include deriving a first interpolation value by interpolating a left reference pixel disposed in the same row as a target prediction pixel and the filtered nth upper reference pixel, deriving a second interpolation value by interpolating an upper reference pixel disposed in the same column as the target prediction pixel and the filtered nth left reference pixel, and deriving a prediction pixel value of the target prediction pixel using an average of the first interpolation value and the second interpolation value. The neighboring pixels of the nth upper reference pixel may include an (n−1)th upper reference pixel and an (n+1)th upper reference pixel. The neighboring pixels of the nth left reference pixel may include an (n−1)th left reference pixel and an (n+1)th left reference pixel. The filter may be a 3-tap filter and may give a weight of 1 to an (n−1)th upper reference pixel, a weight of 2 to the nth upper reference pixel, and a weight of 1 to an (n+1)th upper reference pixel. The neighboring pixels of the nth upper reference pixel may include an (n−1)th upper reference pixel and an (n+1)th upper reference pixel, and when there is no the (n+1)th upper reference pixel, a value of the nth upper reference pixel may be used as a value of the (n+1)th upper reference pixel. The neighboring pixels of the nth left reference pixel may include an (n−1)th left reference pixel and an (n+1)th left reference pixel, and when there is no the (n+1)th left reference pixel, a value of the nth left reference pixel may be used as a value of the (n+1)th left reference pixel.

Another embodiment of the present invention provides a video decoding apparatus including a filtering module to derive an nth upper reference pixel by filtering the nth upper reference pixel of a target prediction block and neighboring pixels of the nth upper reference pixel and to derive an nth left reference pixel by filtering the nth left reference pixel of the target prediction block and neighboring pixels of the nth left reference pixel, and an interpolation module to perform interpolation based on the nth upper reference pixel and the nth left reference pixel filtered by the filtering module. The interpolation module may derive a prediction value of a bottom-right pixel of the target prediction block using an average of the filtered nth left reference pixel and the filtered nth upper reference pixel, derive prediction values of pixels included in an nth column of the target prediction block by interpolating the prediction value of the bottom-right pixel of the target prediction block and the filtered nth upper reference pixel, derive prediction values of pixels included in an nth row of the target prediction block by interpolating the prediction value of the bottom-right pixel of the target prediction block and the filtered nth left reference pixel, and derive a prediction value of a target prediction pixel by bilinear-interpolating a pixel value of an upper reference pixel and a prediction pixel value of the nth row located in the same column as the target prediction pixel, and a pixel value of a left reference pixel and a prediction pixel value of the nth column located in the same row as the target prediction pixel. The interpolation module may derive a first interpolation value by interpolating a left reference pixel located in the same row as a target prediction pixel and the filtered nth upper reference pixel, derive a second interpolation value by interpolating an upper reference pixel located in the same column as the target prediction pixel and the filtered nth left reference pixel, and derive a prediction pixel value of the target prediction pixel using an average of the first interpolation value and the second interpolation value. The neighboring pixels of the nth upper reference pixel may include an (n−1)th upper reference pixel and an (n+1)th upper reference pixel. The neighboring pixels of the nth left reference pixel may include an (n−1)th left reference pixel and an (n+1)th left reference pixel. The filter may be a 3-tap filter and give a weight of 1 to an (n−1)th upper reference pixel, a weight of 2 to the nth upper reference pixel, and a weight of 1 to an (n+1)th upper reference pixel. The neighboring pixels of the nth upper reference pixel may include an (n−1)th upper reference pixel and an (n+1)th upper reference pixel, and when there is no the (n+1)th upper reference pixel, a value of the nth upper reference pixel may be used as a value of the (n+1)th upper reference pixel. The neighboring pixels of the nth left reference pixel may include an (n−1)th left reference pixel and an (n+1)th left reference pixel, and when there is no the (n+1)th left reference pixel, a value of the nth left reference pixel may be used as a value of the (n+1)th left reference pixel.

As described above, according to an intra prediction method using filtering and an apparatus using the method in accordance with an exemplary embodiment of the present invention, advanced intra prediction is used to generate a prediction block similar to an original block, thereby improving encoding/decoding efficiency.

BRIEF DESCRIPTION OF THE DRAWINGS

FIG. 4 schematically illustrates a planar mode as advanced intra prediction (AIP) according to an exemplary embodiment of the present invention.

DESCRIPTION OF EXEMPLARY EMBODIMENTS

Figure 1:
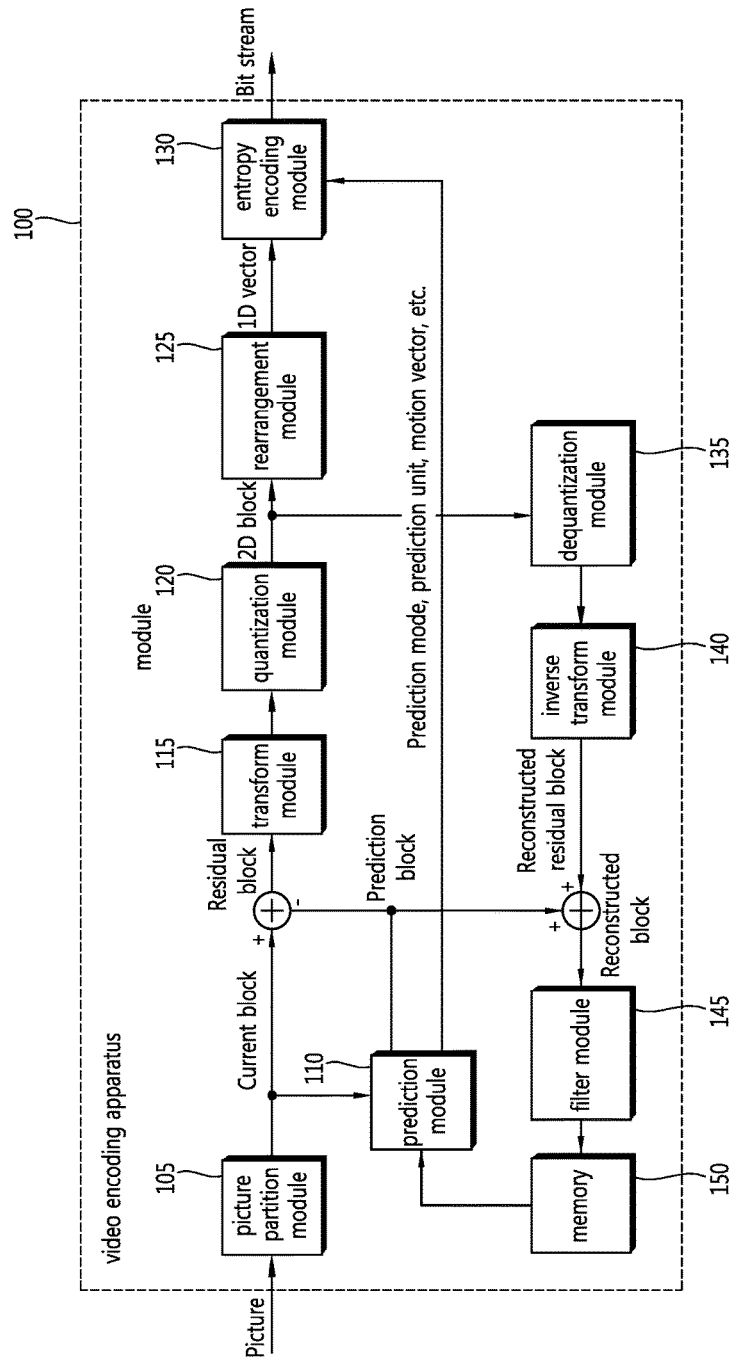
FIG. 1 is a block diagram illustrating a video encoding apparatus according to an exemplary embodiment of the present invention.

The present invention may be modified in various ways and include several embodiments. Specific embodiments of the present invention are illustrated in the drawings and described in detail. The present invention, however, should not be construed as limited to the exemplary embodiments set forth herein but may include any modifications, equivalents or alternatives within the spirit and scope of the present invention. Like reference numerals refer to like elements throughout.

It will be understood that, although the terms first, second, etc., may be used herein to describe various elements, components and/or sections, these elements, components and/or sections should not be limited by these terms. These terms are only used to distinguish one element, component or section from another element, component or section. Thus, a first element, component or section could be termed a second element, component or section, and vice versa without departing from the teachings of the present invention. The term "and/or" includes any and all combinations of one or more of the associated listed items.

It will be understood that when an element or component is referred to as being "linked to" or "connected to" another element or component, the element or component can be directly linked to or connected to another element or component or intervening elements or components. In contrast, when an element or component is referred to as being "directly linked to" or "directly connected to" another element or component, there are no intervening elements or components present.

The terms used in this specification are used to describe only the specific embodiments and are not intended to restrict the technical scope of the present invention. An expression referencing a singular value additionally refers to a corresponding expression of the plural number, unless explicitly limited otherwise by the context. In this specification, terms, such as "comprise" or "have", are intended to designate those characteristics, numbers, steps, operations, elements or parts which are described in the specification, or any combination thereof that exist, and it should be understood that they do not preclude the possibility of the existence or possible addition of one or more additional characteristics, numbers, steps, operations, elements, or parts, or combinations thereof.

Hereinafter, exemplary embodiments of the present invention are described in detail with reference to the accompanying drawings. Hereinafter, the same reference numerals will designate the same elements throughout the drawings, and redundant description of the same elements is omitted.

FIG. 1 is a block diagram illustrating a video encoding apparatus according to an exemplary embodiment of the present invention.

Referring to FIG. 1, the video encoding apparatus 100 may include a picture partition module 105, a prediction module 110, a transform module 115, a quantization module 120, a rearrangement module 125, an entropy encoding module 130, a dequantization module 135, an inverse transform module 140, a filter module 145, and a memory 150.

Although elements shown in FIG. 1 are independently shown so as to describe different features and functions of the video encoding apparatus, such a configuration does not indicate that each element is constructed by a separate hardware constituent or software constituent. That is, the elements are independently arranged and at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some constituents are not essential to the substantial functions in the invention and may be optional constituents for merely improving performance. The invention may be embodied to include only constituents essential to embodiment of the invention, except for the constituents used to merely improve performance. The structure including only the essential constituents except for the optical constituents used to merely improve performance belongs to the scope of the invention.

The picture partition module 105 may partition an input picture into one or more processing units. Here, the processing unit may be a prediction unit (PU), a transform unit (TU), or a coding unit (CU). The picture partition module 105 may partition a picture into combinations of a plurality of CUs, PUs and TUs and select a combination of CUs, PUs and TUs based on a predetermined criterion, for example, a cost function, to encode the picture.

For example, one picture may be partitioned into a plurality of coding units. A recursive tree structure, such as a quad tree structure, may be used to partition a picture into coding units. A coding unit which is partitioned into different coding units with a picture or a coding unit of a maximum size as a root may be partitioned with child nodes as many as the partitioned coding units. A coding unit which is not partitioned any more according to a predetermined limitation is a leaf node. That is, when it is assumed that a coding unit may be partitioned in only a square shape, a single coding unit may be partitioned into at most four different coding units.

In the embodiments of the invention, a coding unit may be used to refer to not only a unit for encoding but also a unit for decoding.

A prediction unit may be partitioned in at least one square or rectangular shape with the same size in a coding unit, or be partitioned such that one of partitioned prediction units in a coding unit has a different shape from another prediction unit.

When a coding unit, which is used to generate a prediction unit to be subjected to intra prediction, is not a minimum coding unit, the coding unit may be subjected to intra prediction without being partitioned into a plurality of prediction units (N☐N).

The prediction module 110 may include an inter prediction module to perform inter prediction and an intra prediction module to perform intra prediction. The prediction module 110 may determine which of inter prediction or intra prediction should be performed on a prediction unit, and may determine specific information (for example, intra prediction mode, motion vector, and reference picture) of the determined prediction method. Here, a process unit on which prediction is performed may be different from a process unit for which a prediction method and specific information are determined. For example, a prediction method and a prediction mode may be determined for each prediction unit, while prediction may be performed for each transform unit. A residual value (residual block) between a generated prediction block and an original block may be input to the transform module 115. Further, prediction mode information, motion vector information, and the like used for prediction may be encoded along with the residual value by the entropy encoding module 130 and be transmitted to the decoding apparatus. When a specific encoding mode is used, the original block may be encoded and transmitted to the decoding apparatus without generating a prediction block through the prediction module 110.

The inter prediction module may predict a prediction unit on the basis of information on at least one picture among previous pictures and subsequent pictures of a current picture. The inter prediction module may include a reference picture interpolation module, a motion prediction module, and a motion compensation module.

The reference picture interpolation module is supplied with reference picture information from the memory 150 and generates pixel information less than an integer pixel from a reference picture. In the case of luma pixels, a DCT-based 8-tap interpolation filter having a varying filter coefficient may be used to generate pixel information less than an integer pixel in a unit of ¼ pixel. In the case of chroma pixels, a DCT-based 4-tap interpolation filter having a varying filter coefficient may be used to generate pixel information less than an integer pixel in a unit of ⅛ pixel.

The motion prediction module may perform motion prediction on the basis of the reference picture interpolated by the reference picture interpolation module. Various methods, such as a full search-based block matching algorithm (FBMA), a three-step search (TSS) algorithm and a new three-step search (NTS) algorithm, may be used to calculate a motion vector. A motion vector has a motion vector value in a unit of ½ or ¼ pixel on the basis of an interpolated pixel. The motion prediction module may predict a current prediction unit using different motion prediction methods. Various methods, such as skip, merge, and advanced motion vector prediction (AMVP), may be used as the motion prediction method.

A method of constructing a motion vector predictor candidate list in performing inter prediction using AMVP according to an embodiment of the invention will be described below.

The intra prediction module may generate a prediction unit on the basis of reference pixel information around a current block which is pixel information in a current picture. When a block around a current prediction unit is a block having been subjected to inter prediction and thereby a reference pixel is a pixel having been subjected to inter prediction, reference pixels included in the block having been subjected to inter prediction may be replaced with reference pixel information on a block having been subjected to intra prediction around the current block. That is, when a reference pixel is not available, unavailable reference pixel information may be replaced with at least one reference pixel of the available reference pixels.

A prediction mode of intra prediction includes a directive prediction mode in which reference pixel information is used according to a prediction direction and a non-directive prediction mode in which directivity information is not used in performing prediction. A mode for predicting luma information and a mode for predicting chroma information may be different from each other. Intra prediction mode information obtained by luma information or predicted luma signal information may be used to predict chroma information.

When a prediction unit and a transform unit have the same size in performing intra prediction, intra prediction on the prediction unit may be performed based on left pixels, an upper-left pixel and upper pixels of the prediction unit. On the other hand, when a prediction unit and a transform unit have different sizes in performing intra prediction, intra prediction may be performed using reference pixels based on the transform unit. Intra prediction using N☐N partitioning may be used only for a minimum coding unit.

In the intra prediction method, a MDIS (Mode Dependent Intra Smoothing) filter may be applied to reference pixels according to the prediction mode and then a predicted block may be generated. Types of the MDIS filters applied to the reference pixels may vary. In the intra prediction method, the intra prediction mode of a current prediction unit may be predicted from an intra prediction mode of a prediction unit located around the current prediction unit. In predicting the prediction mode of the current prediction unit using mode information predicted from a neighboring prediction unit, when the current prediction unit and the neighboring prediction unit have the same intra prediction mode, information indicating that the current prediction unit and the neighboring prediction unit have the same prediction mode may be transmitted using predetermined flag information. If the current prediction unit and the neighboring prediction unit have different prediction modes, information on the prediction mode of the current block may be encoded by entropy encoding.

A residual block including residual information which is a difference between a prediction unit performed prediction based on the prediction unit generated by the prediction module 110 and an original block of the prediction unit may be generated. The generated residual block may be input to the transform module 115. The transform module 115 may transform the residual block including the residual information of the prediction unit generated by the prediction module 110 and the original block using a transform method such as DCT (Discrete Cosine Transform) or DST (Discrete Sine Transform). A transform method to be used to transform the residual block may be determined among DCT and DST on the basis of the intra prediction mode information of the prediction unit used to generate the residual block.

The quantization module 120 may quantize values transformed into a frequency domain by the transform module 115. A quantization coefficient may change depending on a block or importance of a picture. Values output from the quantization module 120 may be supplied to the dequantization module 135 and the rearrangement module 125.

The rearrangement module 125 may rearrange coefficients with respect to quantized residual values.

The rearrangement module 125 may change two-dimensional block type coefficients to one-dimensional vector type coefficients through coefficient scanning. For example, the rearrangement module 125 may change two-dimensional block type coefficients to one-dimensional vector type coefficients by scanning from DC coefficients to coefficients of a high frequency domain using zigzag scanning. Vertical scanning of scanning two-dimensional block type coefficients in a column direction and horizontal scanning of scanning two-dimensional block type coefficients in a row direction may be used depending on a size of a transform unit and an intra prediction mode, instead of zigzag scanning. That is, a scanning method for use may be selected based on the size of a transform unit and the intra prediction mode among zigzag scanning, vertical scanning, and horizontal scanning.

The entropy encoding module 130 may perform entropy encoding on the basis of the values obtained by the rearrangement module 125. Various encoding methods, such as Exponential Golomb, variable length coding (VLC), and context-adaptive binary arithmetic coding (CABAC), may be used for entropy encoding.

The entropy encoding module 130 may encode a variety of information, such as residual coefficient information and block type information on a coding unit, prediction mode information, partitioning unit information, prediction unit information, transfer unit information, motion vector information, reference frame information, block interpolation information and filtering information from the rearrangement module 125 and the prediction module 110.

The entropy encoding module 130 may entropy-encode coefficients of a coding unit input from the rearrangement module 125.

The dequantization module 135 and the inverse transform module 140 inversely quantize the values quantized by the quantization module 120 and inversely transform the values transformed by the transform module 115. The residual values generated by the dequantization module 135 and the inverse transform module 140 may be added to the prediction unit, which is predicted by the motion vector prediction module, the motion compensation module, and the intra prediction module of the prediction module 110, thereby generating a reconstructed block.

The filter module 145 may include at least one of a deblocking filter, an offset correction module, and an adaptive loop filter (ALF).

The deblocking filter 145 may remove block distortion generated on boundaries between blocks in the reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering is performed in applying the deblocking filter, horizontal filtering and vertical filtering may be performed in parallel.

The offset correction module may correct an offset of the deblocked picture from the original picture by pixel. A method of partitioning pixels of a picture into a predetermined number of regions, determining a region to be subjected to offset correction, and applying offset correction to the determined region or a method of applying offset correction in consideration of edge information on each pixel may be used to perform offset correction on a specific picture.

The ALF may perform filtering based on a comparison result of the filtered reconstructed picture and the original picture. Pixels included in a picture may be partitioned into predetermined groups, a filter to be applied to each group may be determined, and differential filtering may be performed for each group. Information on whether to apply the ALF may be transferred by the coding units (CU) and a size and coefficient of an ALF to be applied to each block may vary. The ALF may have various types and a number of coefficients included in a corresponding filter may vary. Filtering-related information on the ALF, such as filter coefficient information, ALF ON/OFF information, and filter type information, may be included and transferred in a predetermined parameter set of a bitstream.

The memory 150 may store the reconstructed block or picture output from the filter module 145 and the stored reconstructed block or picture may be supplied to the prediction module 110 when performing inter prediction.

Figure 2:
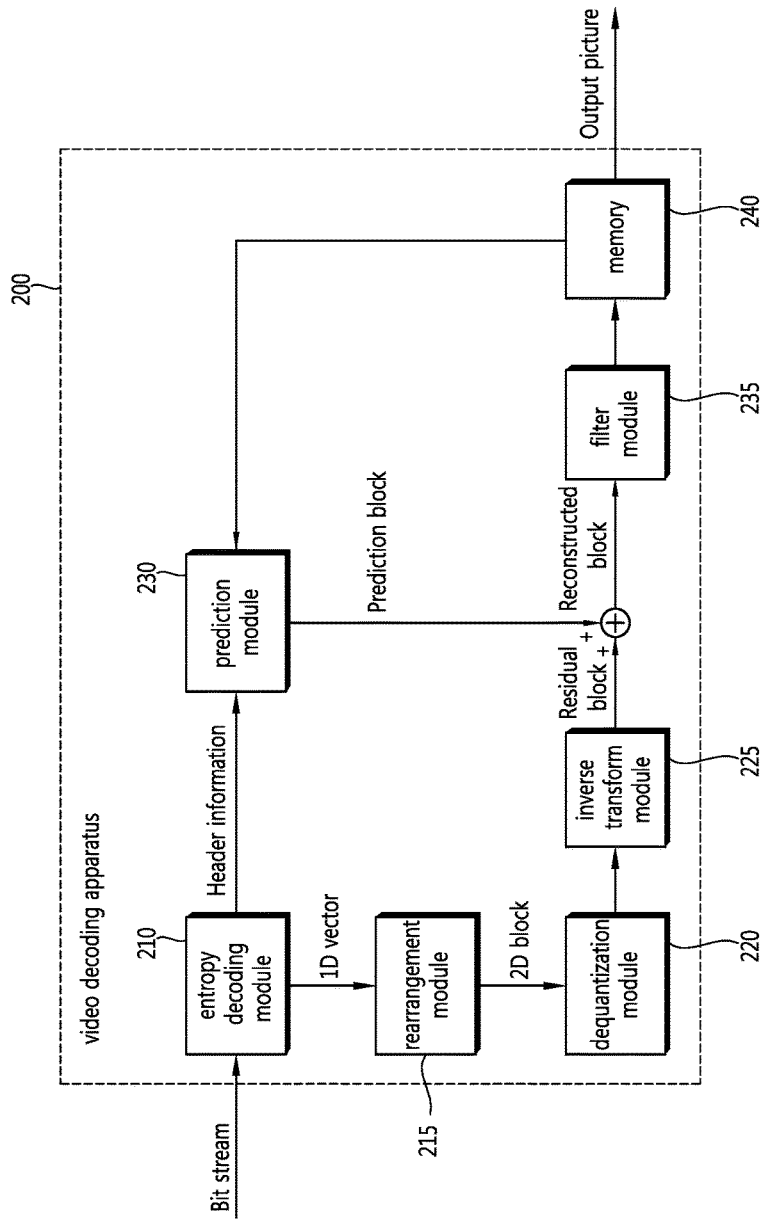
FIG. 2 is a block diagram illustrating a video decoding apparatus according to an exemplary embodiment of the present invention.

FIG. 2 is a block diagram illustrating a video decoding apparatus according an exemplary embodiment of the present invention.

Referring to FIG. 2, the video decoding apparatus 200 may include an entropy decoding module 210, a rearrangement module 215, a dequantization module 220, an inverse transform module 225, a prediction module 230, a filter module 235, and a memory 240.

When a video bitstream is input from the video encoding apparatus, the input bitstream may be decoded according to an inverse process of the video encoding process by the video encoding apparatus.

The entropy decoding module 210 may perform entropy decoding according to an inverse process of the entropy encoding process by the entropy encoding module of the video encoding apparatus. Residual values obtained via entropy decoding by the entropy decoding module may be input to the rearrangement module 215.

The entropy decoding module 210 may decode information associated with intra prediction and inter prediction performed by the encoding apparatus. As described above, when the video encoding apparatus has predetermined restrictions in performing intra prediction and inter prediction, the entropy decoding module 210 may perform entropy decoding based on the restrictions to obtain information on intra prediction and inter prediction of a current block.

The rearrangement module 215 may perform rearrangement on the bitstream entropy-decoded by the entropy decoding module 210 on the basis of the rearrangement method of the encoding module. The rearrangement module 215 may reconstruct and rearrange coefficients expressed in a one-dimensional vector form into two-dimensional block type coefficients. The rearrangement module 215 may be supplied with information associated with coefficient scanning performed by the encoding module and may perform rearrangement using a method of inversely scanning the coefficients on the basis of scanning order in which scanning is performed by the encoding module.

The dequantization module 220 may perform dequantization on the basis of the quantization parameters supplied from the encoding apparatus and the rearranged coefficients of the block.

The inverse transform module 225 may perform inverse DCT and inverse DST on a quantization result performed by the video encoding apparatus having been subjected to DCT and DST performed by the transform module. Inverse transform may be performed on the basis of a transfer unit determined by the video encoding apparatus. The transform module of the video encoding apparatus may selectively perform DCT and DST depending on a plurality of information elements, such as a prediction method, a size of the current block and a prediction direction, and the inverse transform module 225 of the video decoding apparatus may perform inverse transform on the basis of transform information performed by the transform module of the video encoding apparatus.

Transform may be performed by coding unit instead of by transform unit.

The prediction module 230 may generate a prediction block on the basis of prediction block generation information supplied from the entropy decoding module 210 and information on a previously-decoded block or picture supplied from the memory 240.

Similarly to the operation of the video encoding apparatus as described above, when a prediction unit and a transform unit have the same size in performing the intra prediction, intra prediction on the prediction unit is performed based on left pixels, an upper-left pixel and upper pixels of the prediction unit. On the other hand, when a prediction unit and a transform unit have different sizes in performing intra prediction, intra prediction may be performed using reference pixels based on the transform unit. Intra prediction using N☐N partitioning may be used only for a minimum coding unit.

The prediction module 230 includes a prediction unit determination module, an inter prediction module, and an intra prediction module. The prediction unit determination module may receive a variety of information, such as prediction unit information, prediction mode information on a intra prediction method, and motion prediction-related information on a inter prediction method input from the entropy decoding module, may recognize a prediction unit in a current coding unit, and may determine which of the inter prediction and the intra prediction is performed on the prediction unit. The inter prediction module may perform inter prediction on a current prediction unit on the basis of information included in at least one picture among previous pictures and subsequent pictures of a current picture including the current prediction unit using information necessary for inter prediction of the current prediction unit supplied from the video encoding apparatus.

In order to perform inter prediction, it may be determined on the basis of a coding unit whether a motion prediction method of a prediction unit included in a coding unit is a skip mode, a merging mode or an AMVP mode.

Hereinafter, a method of constructing a motion vector predictor candidate list in performing inter prediction using AMVP according to an embodiment of the invention will be described.

The intra prediction module may generate a prediction block on the basis of pixel information in a current picture. When a prediction unit is the prediction unit obtained by intra prediction, intra prediction may be performed based on intra prediction mode information on the prediction unit supplied from the video encoding apparatus. The intra prediction module may include an MDIS filter, a reference pixel interpolation module, and a DC filter. The MDIS filter is a module that performs filtering on reference pixels of a current block and may be applied by determining whether to apply the filter depending on a prediction mode of a current prediction unit. MDIS filtering may be performed on the reference pixels of the current block using the prediction mode of the prediction unit and information on the MDIS filter supplied from the video encoding apparatus. When the prediction mode of the current block is a mode of not performing MDIS filtering, the MDIS filter may not be applied.

When the prediction mode of the prediction unit is a prediction unit to be applied to intra prediction on the basis of pixel values obtained by interpolating the reference pixels, the reference pixel interpolation module may generate reference pixels in a pixel unit of less than an integer by interpolating the reference pixels. When the prediction mode of the current prediction unit is a prediction mode of generating a prediction block without interpolating the reference pixels, the reference pixels may not be interpolated. The DC filter may generate a prediction block through filtering when the prediction mode of the current block is the DC mode.

The reconstructed block or picture may be supplied to the filter module 235. The filter module 235 includes a deblocking filter, an offset correction module, and an ALF.

Information on whether the deblocking filter is applied to a corresponding block or picture and information on which of a strong filter and a weak filter is applied when the deblocking filter is used may be supplied from the video encoding apparatus. The deblocking filter of the video decoding apparatus may be supplied with information on the deblocking filter from the video encoding apparatus and may perform deblocking filtering on a corresponding block in the decoding apparatus. Similarly to the video encoding apparatus, vertical deblocking filtering and horizontal deblocking filter are performed first, and at least one of vertical deblocking filtering and horizontal deblocking filtering may be performed on an overlapping region. Vertical deblocking filtering or horizontal deblocking filtering which is not previously performed may be performed on the region in which vertical deblocking filtering and horizontal deblocking filtering overlap. This deblocking filtering process may enable parallel processing of deblocking filtering.

The offset correction module may perform offset correction on the reconstructed picture on the basis of an offset correction type and offset value information applied to the picture in encoding.

The ALF may perform filtering on the basis of a comparison result between the reconstructed picture obtained via filtering and the original picture. The ALF may be applied to a coding unit on the basis of information on whether to apply the ALF and ALF coefficient information supplied from the encoding apparatus. The ALF information may be included and supplied in a specific parameter set.

The memory 240 may store the reconstructed picture or block for use as a reference picture or a reference block and may supply the reconstructed picture to an output module.

As described above, in the embodiments of the invention, the coding unit is used as an encoding unit but may be also used as a unit of decoding.

A video encoding method and a video decoding method, which will be mentioned later in the embodiments of the invention, may be performed by the components of the video encoding apparatus and the video decoding apparatus described above with reference to FIGS. 1 and 2. The components may include not only hardware constituents but software process units which may be performed through algorithms.

Hereinafter, the intra prediction method according to the exemplary embodiment may be used instead of a conventional intra prediction method or be selectively used with a conventional intra prediction mode based on flag information. The intra prediction mode according to the exemplary embodiment of the present invention may be referred to as advanced intra prediction (AIP), and information on whether prediction is performed by AIP or by general intra prediction instead of AIP may be transferred through the flag information. For example, a flag advanced_intra_pred_flag may be included and transferred in a high level syntax structure, such as a sequence parameter set (SPS), a picture parameter set (PPS) or a slice header. An AIP mode may be transferred with respect to each of a luma signal and a chroma signal. A luma signal may be transferred through advanced_intra_pred_flag, and a chroma signal may be transferred through advanced_intra_pred_chroma_flag.

Figure 3:
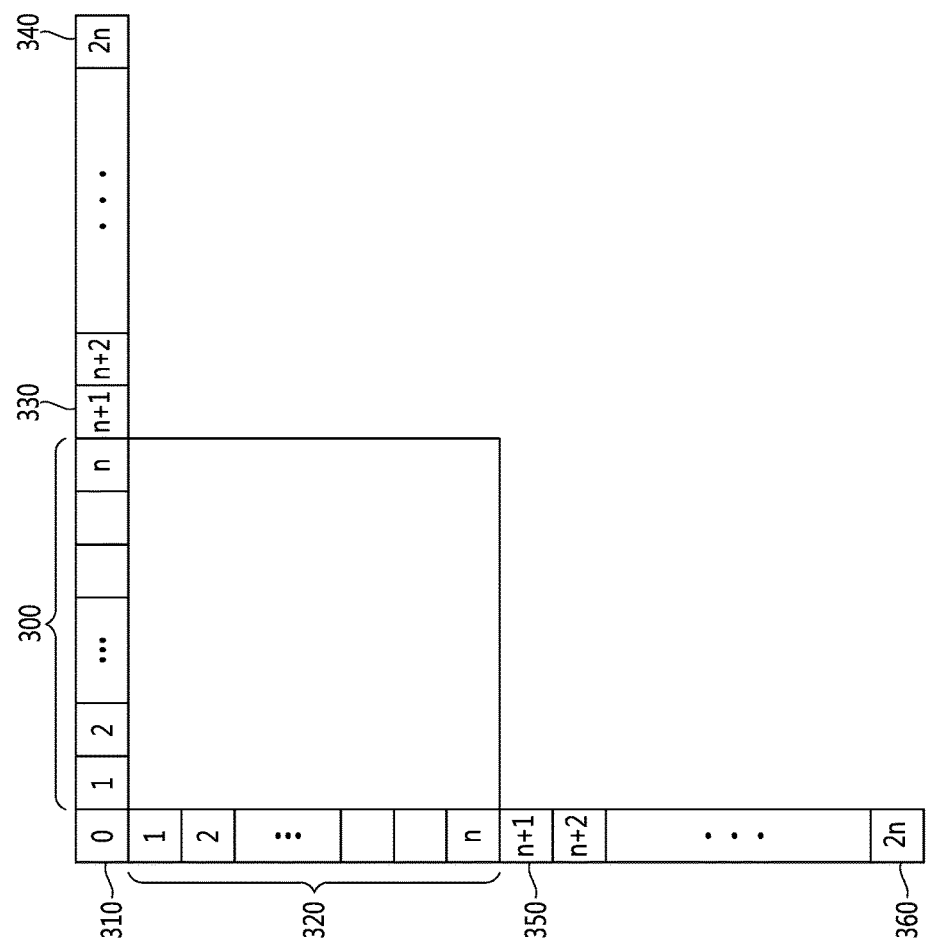
FIG. 3 illustrates a prediction unit and a reference pixel according to an exemplary embodiment of the present invention.

FIG. 3 illustrates a prediction unit and reference pixels according to an exemplary embodiment of the present invention.

Referring to FIG. 3, the reference pixels may be divided into upper reference pixels 300, an upper-left reference pixel 310 and left reference pixels 320.

When a size of a block is n×n and a number of upper reference pixels is n, a first reference pixel among the upper reference pixels may be referred to as a first upper reference pixel, a rightmost pixel among the upper reference pixels thereof to an nth upper reference pixel, a pixel located on a top among the left reference pixels to a first left reference pixel, and a pixel located on a bottom among the left reference pixels to an nth left reference pixel. In this way, sequentially, an (n+1)th pixel located on an immediately right side of the nth upper reference pixel may be referred to as an (n+1)th upper reference pixel 330, and a 2nth pixel to a 2nth upper reference pixel 340. Likewise, an (n+1)th pixel located immediately below the nth left reference pixel may be referred to as an (n+1)th left reference pixel 350, and a 2nth pixel to a 2nth left reference pixel 360.

In the prediction unit, columns and rows including pixels may be represented as first to nth columns and first to nth rows, respectively.

FIG. 4 schematically illustrates a planar mode as AIP according to an exemplary embodiment of the present invention.

Referring to FIG. 4, a prediction value of a rightmost bottom pixel 410 of a prediction unit is derived (S400).

A method of deriving a DC prediction value may be used to obtain the prediction value of the rightmost bottom pixel 410 of the prediction unit. For example, the prediction value of the rightmost bottom sample 410 may be obtained by calculating an average of pixel values of a first upper reference pixel to an nth upper reference pixel, a first left reference pixel to a nth left reference pixel, and an upper-left reference pixel.

Prediction values of an nth column are derived by interpolating an nth upper reference pixel 425 and the rightmost bottom pixel 410, and prediction values of an nth row are derived by interpolating an nth left reference pixel 430 and the rightmost bottom pixel 410 (S420).

The prediction values of the nth row of the prediction unit may be derived by interpolating the nth upper reference pixel 425 and the rightmost bottom pixel 410, and the prediction values of the nth column of the prediction unit may be derived by interpolating the nth left reference pixel 430 and the rightmost bottom pixel 410.

A prediction value of a target prediction pixel is generated using one pixel of the upper reference pixels, one pixel of the left reference pixels, one pixel from the prediction values of the nth column and one pixel from the prediction values of the nth row (S440).

The prediction value of the target prediction pixel may be derived by bilinear interpolation of a pixel value 445 of an upper reference pixel located vertically above in the same column as the target prediction pixel and a prediction pixel value 450 of the nth row located vertically below in the same column as the target prediction pixel, and a pixel value 455 of a left reference pixel located horizontally on left side in the same row as the target prediction pixel and a prediction pixel value 460 of the nth column located horizontally on right side in the same row as the target prediction pixel.

Planar prediction described above first predicts pixels in the nth row and nth column of the prediction unit, thereby effectively predicting a region with a flat feature.

Figure 5:
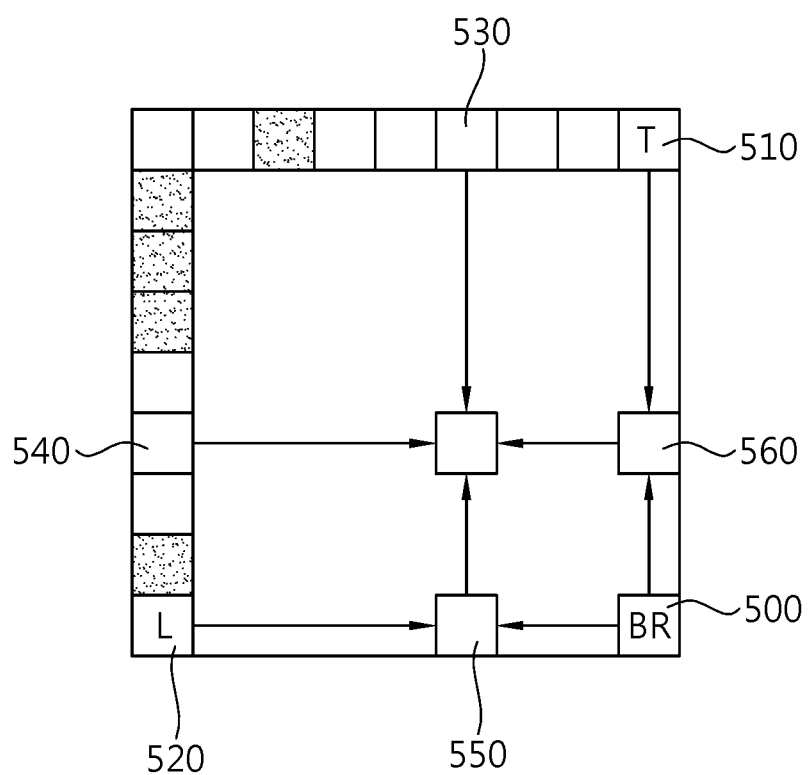
FIG. 5 schematically illustrates a planar mode as AIP according to an exemplary embodiment of the present invention.

FIG. 5 schematically illustrates a planar mode as AIP according to an exemplary embodiment of the present invention.

Referring to FIG. 5, a prediction value of a bottom right pixel 500 of a prediction unit is derived.

The prediction value of the bottom right pixel 500 of the prediction unit is derived as an average of an nth upper reference pixel 510 and an nth left reference pixel 520.

Prediction values of an nth column are derived by interpolating the nth upper reference pixel 510 and the bottom right pixel 500, and prediction values of an nth row are derived by interpolating the nth left reference pixel 520 and the bottom right pixel 500.

That is, the prediction values of the nth column of the prediction unit may be a value obtained by interpolating the nth upper reference pixel 510 and the bottom right pixel 500, while the prediction values of the nth row of the prediction unit may be a value obtained by interpolating the nth left reference pixel 520 and the bottom right pixel 500.

A prediction value of a target prediction pixel is generated using one pixel 530 of upper reference pixels, one pixel 540 of left reference pixels, one pixel 560 from the prediction values of the nth column and one pixel 550 from the prediction values of the nth row.

The prediction value of the target prediction pixel may be derived by bilinear interpolation of a pixel value 530 of an upper reference pixel located vertically above in the same column as the target prediction pixel and a prediction pixel value 550 of the nth row located vertically below in the same column as the target prediction pixel, and a pixel value 540 of a left reference pixel located horizontally on left side in the same row as the target prediction pixel and a prediction pixel value 560 of the nth column located horizontally on right side in the same row as the target prediction pixel.

The foregoing prediction process may reduce complexity involved in performing planar prediction.

Figure 6:
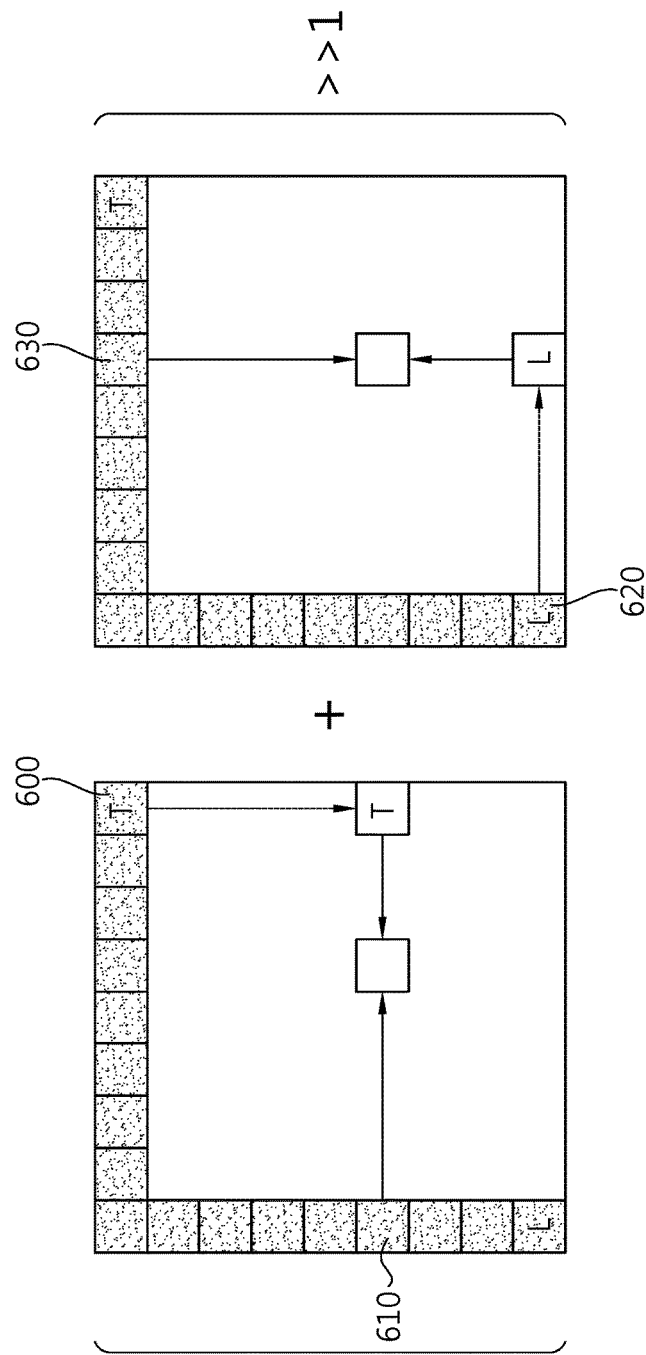
FIG. 6 schematically illustrates a planar mode as AIP according to an exemplary embodiment of the present invention.

FIG. 6 schematically illustrates a planar mode as AIP according to an exemplary embodiment of the present invention.

FIG. 6 brings the same prediction result as FIG. 5 based on a different calculation method from that of FIG. 5.

Referring to FIG. 6, a first prediction value of a target prediction pixel is derived by interpolating an nth upper reference pixel 600 and a left reference pixel 610 located in the same row as the target prediction pixel.

A second prediction value of the target prediction pixel is derived by interpolating an nth left reference pixel 620 and an upper reference pixel 630 located in the same column as the target prediction pixel.

A prediction value of the target prediction pixel is derived by calculating an average of the first prediction value and the second prediction value.

The method shown in FIG. 6 may derive the prediction value of the target prediction pixel using addition and shift operation only, thereby reducing computational complexity.

Figure 7:
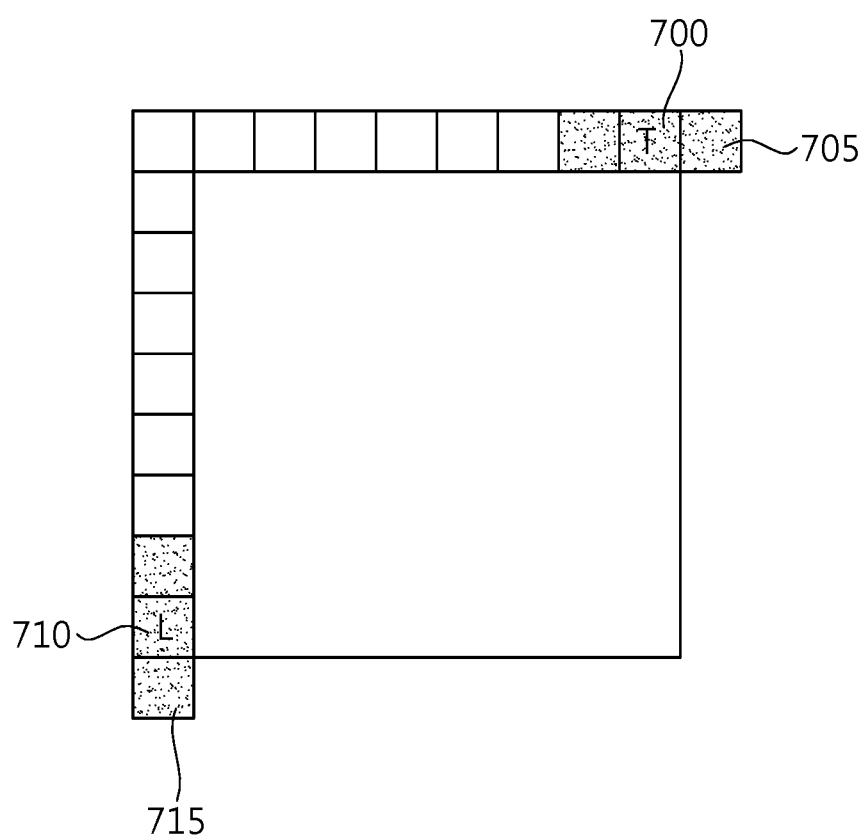
FIG. 7 schematically illustrates a planar prediction method as AIP according to an exemplary embodiment of the present invention.

FIG. 7 schematically illustrates a planar prediction method as intra prediction according to an exemplary embodiment of the present invention.

Referring to FIG. 7, an nth upper reference pixel 700 and neighboring pixels of the nth upper reference pixel are filtered to derive a filtered nth upper reference pixel, and an nth left reference pixel 710 and neighboring pixels of the nth left reference pixel are filtered to derive a filtered nth left reference pixel.

The nth upper reference pixel 700 and the nth left reference pixel 710 may be filtered using a {1,2,1} filter. When the nth upper reference pixel 700 and the nth left reference pixel 710 are filtered, a prediction pixel value is derived based on a reference pixel obtained via smoothing, thereby further enhancing compression performance of a prediction unit.

FIG. 7 illustrates a random number of filtering coefficients and a random number of taps of a filter, and an alternative number of filter taps or filter coefficients may be also used for filtering. Further, the nth upper reference pixel and the nth left reference pixel may be filtered using different filters.

Equation 1 represents a value of the filtered nth upper reference pixel.

$$T'=\{P(x-1,y)+2\times P(x,y)+P(x+1,y)+2\}/4$$

$$T'=\{P(x-1,y)+(P(x,y)<<1)+P(x+1,y)+2\}>>2 \quad \text{[Equation 1]}$$

When an (n+1)th upper reference pixel 705 is unavailable in filtering the nth upper reference pixel, for example, as the pixel is a rightmost pixel or a sample not yet reconstructed, filtering is performed on the pixel after a value of the nth upper reference pixel 700 is copied into a value of the (n+1)th upper reference pixel 705. Equation 2 illustrates that filtering is performed on the pixel after the value of the nth upper reference pixel 700 is copied into the value of the (n+1)th upper reference pixel 705.

$$T'=\{P(x-1,y)+3\times P(x,y)+2\}/4$$

$$T'=\{P(x-1,y)+(P(x,y)<<1)+P(x,y)+2\}>>2 \quad \text{[Equation 2]}$$

In FIG. 7, when the (n+1)th upper reference pixel 705 is unavailable, the value of the nth upper reference pixel 700 may be replaced with a value of another reference pixel, instead of replacing a value of the(n+1)th upper reference pixel 705 with the value of the nth upper reference pixel, which is included in the scope of the present invention.

Equation 2 represents a value of the filtered nth left reference pixel 710.

$$L'=\{P(x,y-1)+2\times P(x,y)+P(x,y+1)+2\}/4$$

$$L'=\{P(x,y-1)+(P(x,y)<<1)+P(x,y+1)+2\}>>2 \quad \text{[Equation 3]}$$

Likewise, when an (n+1)th left reference pixel 715 is unavailable in filtering the nth left reference pixel 710, for example, as the pixel is an undermost pixel or a sample not yet reconstructed, filtering is performed on the pixel after a value of the nth left reference pixel 710 is copied into a value of the (n+1)th left reference pixel 715. Equation 4 illustrates that filtering is performed on the pixel after the value of the nth left reference pixel 710 is copied into the value of the (n+1)th left reference pixel 715.

$$L'=\{P(x,y-1)+3\times P(x,y)+2\}/4$$

$$L'=\{P(x,y-1)+(P(x,y)<<1)+P(x,y)+2\}>>2 \quad \text{[Equation 4]}$$

In FIG. 7, when the (n+1)th left reference pixel 715 is unavailable, the value of the nth left reference pixel 710 may be replaced with a value of another reference pixel, instead of replacing a value of the(n+1)th left reference pixel 715 with the value of the nth left reference pixel, which is included in the scope of the present invention.

Intra prediction using a planar mode may be performed in the same process as illustrated with reference to FIGS. 5 and 6 based on the filtered nth upper reference pixel and the filtered nth left reference pixel.

A bottom right pixel is derived using an average value of the filtered nth upper reference pixel and the filtered nth left reference pixel.

Prediction values of an nth column are derived by interpolating the filtered nth upper reference pixel and the bottom right pixel, while prediction values of an nth row are derived by interpolating the filtered nth left reference pixel and the bottom right pixel. The prediction values of the nth row of the prediction unit may be a value obtained by interpolating the filtered nth left reference pixel and the bottom right pixel, while the prediction values of the nth column of the prediction unit may be derived value obtained by interpolating the filtered nth upper reference pixel and the bottom right pixel.

Subsequently, a prediction value of a target prediction pixel is generated using one pixel of the upper reference pixels, one pixel of the left reference pixels, one pixel from the prediction values of the nth column and one pixel from the prediction values of the nth row.

The prediction value of the target prediction pixel may be derived by bilinear interpolation of a pixel value of an upper reference pixel located vertically above in the same column as the target prediction pixel and a prediction pixel value of the nth row located vertically below in the same column as the target prediction pixel, and a pixel value of a left reference pixel located horizontally on left side in the same row as the target prediction pixel and a prediction pixel value of the nth column located horizontally on right side in the same row as the target prediction pixel.

Further, similar to FIG. 6, a first prediction value of the target prediction pixel is derived by interpolating the filtered nth upper reference pixel and a left reference pixel located in the same row as the target prediction pixel.

A second prediction value of the target prediction pixel is derived by interpolating the filtered nth left reference pixel and an upper reference pixel located in the same column as the target prediction pixel.

The prediction value of the target prediction pixel is obtained by calculating an average of the first prediction value and the second prediction value.

Figure 8:
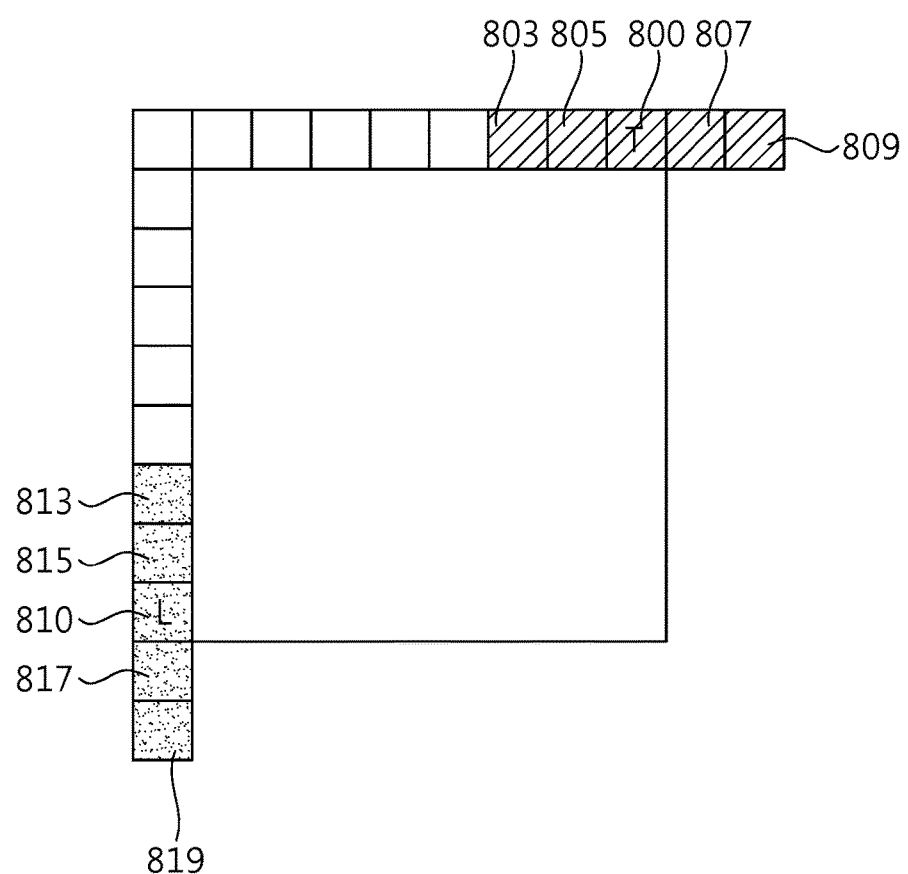
FIG. 8 schematically illustrates a planar prediction method as intra prediction according to an exemplary embodiment of the present invention.

FIG. 8 schematically illustrates a planar prediction method as intra prediction according to an exemplary embodiment of the present invention.

Referring to FIG. 8, in the present embodiment, intra prediction may be performed using a 5-tap filter.

For example, an nth upper reference pixel may be filtered by filtering an (n−2)th upper reference pixel 803, an (n−1)th upper reference pixel 805, an (n+1)th upper reference pixel 807 and an (n+2)th upper reference pixel 809 that neighbor the nth upper reference pixel 800. Coefficients of the filter may be set randomly and a filter with a different number of taps may be used instead of a 5-tap filter.

Referring to FIG. 8, the filtered nth upper reference pixel may be derived using, for example, filter coefficients {1,2, 3,2,1}, so that the nth upper reference pixel has a higher weighted value.

Likewise, an nth left reference pixel 810 may be filtered by filtering an (n−2)th left reference pixel 813, an (n−1)th left reference pixel 815, an (n+1)th left reference pixel 817 and an (n+2)th left reference pixel 819 that neighbor the nth left reference pixel 810 and the filtered nth left reference pixel 810 may be derived.

According to the present embodiment, a number of taps of the filter and coefficient of the filter may change as long as a reference pixel may be filtered to perform planar prediction within the scope of the present invention.

Figure 9:
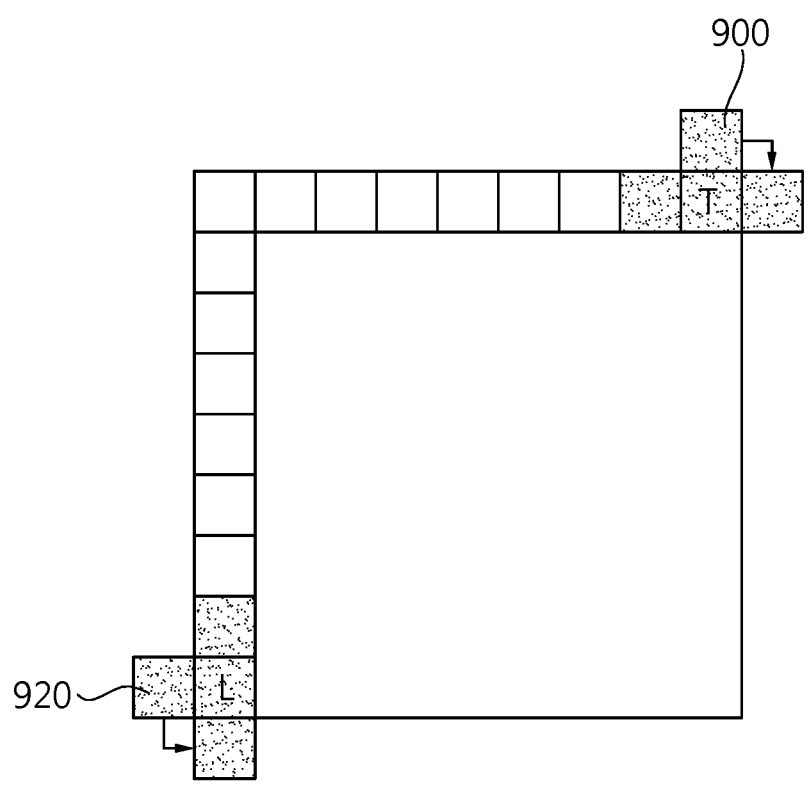
FIG. 9 schematically illustrates a planar prediction method as intra prediction according to an exemplary embodiment of the present invention.

FIG. 9 schematically illustrates a planar prediction method as intra prediction according to an exemplary embodiment of the present invention.

Referring to FIG. 9, when a pixel used for filtering is unavailable in performing filtering, filtering may be performed with another pixel instead of the unavailable pixel or without use of the pixel.

For example, when a block is disposed on an edge of a frame or slice, so that a neighboring pixel for filtering, such as an (n+1)th upper reference pixel, is unavailable, 2-tap filtering may be performed using an (n−1)th upper reference pixel and an nth upper reference pixel only. That is, another pixel and the nth upper reference pixel may be used in filtering, except for the unavailable pixel.

Alternatively, when the (n+1)th upper reference pixel is unavailable, a pixel value of another pixel decoded ahead, for example, a pixel value of a pixel in a different position such as a pixel 900 located immediately above the nth upper reference pixel, may be copied for use.

Likewise, when a block is disposed on an edge of a frame or slice, so that an (n+1)th left reference pixel is unavailable, filtering may be performed using other pixels except for the unavailable pixel, or a pixel value of another pixel decoded ahead, for example, a pixel 920 located on an immediately left side of the nth reference pixel, may be copied for use.

Figure 10:
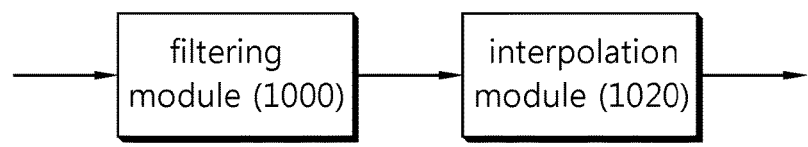
FIG. 10 schematically illustrates part of the video decoding apparatus according to an exemplary embodiment of the present invention.

FIG. 10 schematically illustrates part of the video decoding apparatus according to an exemplary embodiment of the present invention.

Referring to FIG. 10, the prediction module of the video decoding apparatus may include a filtering module 1000 and an interpolation module 1020.

The filtering module 1000 may filter an nth upper reference pixel and a neighboring pixel of the nth upper reference pixel to derive a filtered nth upper reference pixel and filter an nth left reference pixel and a neighboring pixel of the nth left reference pixel to derive a filtered nth left reference pixel. The neighboring pixel of the nth upper reference pixel used for filtering may be an (n−1)th upper reference pixel and an (n+1)th upper reference pixel. When there is no (n+1)th upper reference pixel, a value of the nth upper reference pixel may be used instead of a value of the (n+1)th upper reference pixel. Likewise, the neighboring pixel of the nth left reference pixel used for filtering may be an (n−1)th left reference pixel and an (n+1)th left reference pixel. When there is no (n+1)th left reference pixel, a value of the nth left reference pixel may be used instead of a value of the (n+1)th left reference pixel.

The interpolation module 1020 may interpolate the filtered nth upper reference pixel and a bottom right pixel to generate prediction values of an nth column and interpolate the filtered nth left reference pixel and the bottom right pixel to generate prediction values of an nth row.

When only interpolation is performed without filtering as in FIGS. 4 to 6, the filtering module 1000 may not be included. When only interpolation is performed, a value of the bottom right reference pixel is obtained using an average pixel value of the nth upper reference pixel, the nth left reference pixel and upper and left reference pixels, followed by additional interpolation, thereby generating a prediction block.

The intra prediction methods illustrated in FIGS. 3 to 10 may improve not only prediction efficiency but efficiency in encoding time and decoding time as compared with conventional intra prediction. Further, when higher prediction efficiency is needed according to a profile as using the intra prediction methods illustrated in FIGS. 3 to 10, different intra prediction methods may be used depending on implementation devices using a codec by using an additional intra prediction mode, thereby enhancing freedom of implementation.

The preceding video encoding method and video decoding method may be performed by the components of the video encoding apparatus and the video decoding apparatus described above with reference to FIGS. 1 and 2.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An intra prediction method performed by a decoding apparatus, comprising:
   determining, by the decoding apparatus, an intra prediction is applied to a current block;
   determining, by the decoding apparatus, an intra prediction mode of the current block as an intra planar prediction mode;
   deriving, by the decoding apparatus, neighboring reference samples of the current block; and
   generating, by the decoding apparatus, a prediction sample of the current block based on the neighboring reference samples,
   wherein the prediction sample is derived based on 4 reference samples among the neighboring reference samples,
   wherein the 4 reference samples include a first reference sample located in a same row with the prediction sample, a second reference sample located in a lower side of the first reference sample, a third reference sample located in a same column with the prediction sample, and a fourth reference sample located in a right side of the third reference sample,
   wherein the second reference sample is derived based on a sample located in a lower side of a lowest sample among left reference samples adjacent to a left boundary of the current block, and the fourth reference sample is derived based on a sample located in a right side of a right-most sample among upper reference samples adjacent to an upper boundary of the current block.

2. The method of claim 1, wherein the second reference sample is derived by applying filtering using the sample located in the lower side of the lowest sample among the left reference samples adjacent to the left boundary of the current block, and
   wherein the fourth reference sample is filtered by using the sample located in the right side of the right-most sample among the upper reference samples adjacent to the upper boundary of the current block.

3. The method of claim 1, wherein when a location of the second reference sample is specified by (−1, y) and a location of the fourth reference sample is specified by (x, −1), a value of the second reference sample and a value of the fourth reference sample are derived by using the following equations, $L'=\{P(-1,y-1)+2\times P(-1,y)+P(-1,y+1)+2\}/4,$ $T'=\{P(x-1,-1)+2\times P(x,-1)+P(x+1,-1)+2\}/4,$ where, L' represents the value of the second reference sample, T' represents the value of the fourth reference sample, and P represents a sample value of a corresponding location.

4. The method of claim 1, wherein the second reference sample is derived by applying filtering using adjacent samples of the second reference sample, and the fourth reference sample is filtered by using adjacent samples of the fourth reference sample.

5. The method of claim 4, wherein the adjacent samples of the fourth reference sample include a sample which is adjacent to a right side of the fourth reference sample and a sample which is adjacent to a left side of the fourth reference sample.

6. The method of claim 5, wherein a 3-tap filter is applied to the fourth reference sample,
   wherein the 3-tap filter has a weight of 1 to the reference sample which is adjacent to a right side of the fourth reference sample, a weight of 2 to the fourth reference sample, and a weight of 1 to the reference sample which is adjacent to a left side of the fourth reference sample.

7. The method of claim 4, wherein the adjacent samples of the second reference sample include a sample which is adjacent to a lower side of the second reference sample and a sample which is adjacent to an upper side of the second reference sample.

8. The method of claim 7, wherein a 3-tap filter is applied to the second reference sample,
   wherein the 3-tap filter has a weight of 1 to the reference sample which is adjacent to a lower side of the second reference sample, a weight of 2 to the second reference sample, and a weight of 1 to the reference sample which is adjacent to an upper side of the second reference sample.

9. An intra prediction method performed by an encoding apparatus, comprising:
   determining, by the encoding apparatus, an intra prediction is applied to a current block;
   determining, by the encoding apparatus, an intra prediction mode of the current block as an intra planar prediction mode;
   deriving, by the encoding apparatus, neighboring reference samples of the current block; and
   generating, by the encoding apparatus, a prediction sample of the current block based on the neighboring reference samples,
   wherein the prediction sample is derived based on 4 reference samples among the neighboring reference samples,
   wherein the 4 reference samples include a first reference sample located in a same row with the prediction sample, a second reference sample located in a lower side of the first reference sample, a third reference sample located in a same column with the prediction sample, and a fourth reference sample located in a right side of the third reference sample,
   wherein the second reference sample is derived based on a sample located in a lower side of a lowest sample among left reference samples adjacent to a left boundary of the current block, and the fourth reference sample is derived based on a sample located in a right side of a right-most sample among upper reference samples adjacent to an upper boundary of the current block.

10. The method of claim 9, wherein the second reference sample is derived by applying filtering using the sample located in the lower side of the lowest sample among the left reference samples adjacent to the left boundary of the current block, and
    wherein the fourth reference sample is filtered by using the sample located in the right side of the right-most sample among the upper reference samples adjacent to the upper boundary of the current block.

11. The method of claim 9, wherein when a location of the second reference sample is specified by (−1, y) and a location of the fourth reference sample is specified by (x, −1), a value of the second reference sample and a value of the fourth reference sample are derived by using the following equations, $L'=\{P(-1,y-1)+2\times P(-1,y)+P(-1,y+1)+2\}/4,$ $T'=\{P(x-1,-1)+2\times P(x,-1)+P(x+1,-1)+2\}/4,$ where, L' represents the value of the second reference sample, T' represents the value of the fourth reference sample, and P represents a sample value of a corresponding location.

12. The method of claim 9, wherein the second reference sample is derived by applying filtering using adjacent samples of the second reference sample, and the fourth reference sample is filtered by using adjacent samples of the fourth reference sample.

13. The method of claim 12, wherein the adjacent samples of the fourth reference sample include a sample which is adjacent to a right side of the fourth reference sample and a sample which is adjacent to a left side of the fourth reference sample.

14. The method of claim 13, wherein a 3-tap filter is applied to the fourth reference sample,
wherein the 3-tap filter has a weight of 1 to the reference sample which is adjacent to a right side of the fourth reference sample, a weight of 2 to the fourth reference sample, and a weight of 1 to the reference sample which is adjacent to a left side of the fourth reference sample.

15. The method of claim 12, wherein the adjacent samples of the second reference sample include a sample which is adjacent to a lower side of the second reference sample and a sample which is adjacent to an upper side of the second reference sample.

16. The method of claim 15, wherein a 3-tap filter is applied to the second reference sample,
wherein the 3-tap filter has a weight of 1 to the reference sample which is adjacent to a lower side of the second reference sample, a weight of 2 to the second reference sample, and a weight of 1 to the reference sample which is adjacent to an upper side of the second reference sample.

* * * * *